US005799257A

United States Patent [19]

Meikrantz et al.

[11] Patent Number: 5,799,257

[45] Date of Patent: Aug. 25, 1998

[54] PROCESS FOR GAMMA RAY INDUCED DEGRADATION OF POLYCHLORINATED BIPHENYLS

[75] Inventors: David H. Meikrantz, Idaho Falls; Bruce J. Mincher, Shelley; Rodney E. Arbon, Blackfoot, all of Id.

[73] Assignee: Lockheed Martin Idaho Technologies Company, Idaho Falls, Id.

[21] Appl. No.: 496,385

[22] Filed: Jun. 29, 1995

Related U.S. Application Data

[63] Continuation of Ser. No. 967,306, Oct. 27, 1992, abandoned.

[51] Int. Cl.[6] .............................. A62D 3/00; C07B 35/06

[52] U.S. Cl. .................... 588/200; 588/210; 204/157.15; 204/157.6; 204/157.63

[58] Field of Search .................................... 588/200, 210; 204/157.15, 157.6, 157.63

[56] References Cited

U.S. PATENT DOCUMENTS

| | | | |
|---|---|---|---|
| 4,144,152 | 3/1979 | Kitchens | 204/158 |
| 4,192,727 | 3/1980 | Ward | 521/50.5 |
| 4,345,983 | 8/1982 | Wan | 204/158 |
| 4,425,949 | 1/1984 | Rowe | 141/1 |
| 4,430,208 | 2/1984 | Pytlewski et al. | 210/909 |
| 4,549,528 | 10/1985 | Gibson | 588/234 |
| 4,605,608 | 8/1986 | Bullitt | 430/206 |
| 4,632,742 | 12/1986 | Tundo | 204/158 |
| 4,764,278 | 8/1988 | Chou et al. | 210/634 |
| 4,793,931 | 12/1988 | Stevens et al. | 210/636 |
| 4,832,806 | 5/1989 | Helfritch | 204/157.63 |
| 4,935,144 | 6/1990 | Varma | 204/157 |
| 4,940,519 | 7/1990 | Dames | 204/130 |
| 4,956,064 | 9/1990 | Evers et al. | 204/157.94 |
| 5,035,784 | 7/1991 | Anderson et al. | 204/158 |
| 5,043,080 | 8/1991 | Cater et al. | 210/748 |
| 5,045,288 | 9/1991 | Raupp et al. | 422/186.3 |
| 5,084,140 | 1/1992 | Holland | 201/19 |
| 5,093,302 | 3/1992 | Sasao et al. | 252/625 |
| 5,110,364 | 5/1992 | Mazur et al. | 134/2 |
| 5,126,020 | 6/1992 | Dames | 588/212 |
| 5,174,985 | 12/1992 | Schwarz et al. | 588/205 |
| 5,256,854 | 10/1993 | Bromberg et al. | 250/492.21 |
| 5,393,394 | 2/1995 | Ikeda et al. | 204/157.6 |
| 5,417,825 | 5/1995 | Graham et al. | 588/210 |

OTHER PUBLICATIONS

Sherman, W. V. et al., *Nature*, vol. 232, pp. 118–119 (1971).

Merrill, E. W., et al., *American Institute of Chemical Engineers, Symposium Series*, vol. 74, pp. 245–250 (1978).

Sawai, T., et al., *Bulletin of the Chemical Society of Japan*, vol. 47, No. 8, pp. 1889–1893 (1974).

Evans, R., et al., *Journal of Physical Chemistry*, vol. 75, No. 18, pp. 2762–2764 (1971).

Schweitzer, J. F., et al., *Journal of Radioanalytical and Nuclear Chemistry Letters*, vol. 118, No. 5, pp. 323–330 (1987).

*Primary Examiner*—Edward A. Miller
*Attorney, Agent, or Firm*—Alan D. Kirsch

[57] ABSTRACT

The invention is a process for the in-situ destruction of polychlorinated biphenyl (PCB) compounds in transformer oils and transformers. These compounds are broken down selectively by irradiation of the object or mixture using spent nuclear fuel or any isotopic source of high energy gamma radiation. For example, the level of applied dose required to decompose 400 ppm of polychlorinated biphenyl in transformer oil to less than 50 ppm is 500 kilogray. Destruction of polychlorinated biphenyls to levels of less than 50 ppm renders the transformer oil or transformer non-PCB contaminated under current regulations. Therefore, this process can be used to treat PCB contaminated oil and equipment to minimize or eliminate the generation of PCB hazardous waste.

12 Claims, 3 Drawing Sheets

PROCESS FOR GAMMA RAY INDUCED DEGRADATION OF POLYCHLORINATED BIPHENYLS

CROSS-REFRENCE TO RELATED APPLICATIONS

This is a continuation of application Ser. No. 07/967,306, filed Oct. 27, 1992, now abandoned.

The United States Government has rights in this invention pursuant to Contract No. DE-AC07-76ID01570 between the U.S. Department of Energy and EG&G Idaho, Inc. now Contract No. DE-AC07-94ID13223 between the U.S. Department of Energy and Lockheed Idaho Technologies Company.

BACKGROUND OF THE INVENTION

This invention relates to a process for the degradation of chlorinated hydrocarbons and more particularly to the gamma-ray induced degradation of polychlorinated biphenyls using spent nuclear reactor fuel.

Low levels of chlorinated hydrocarbons are found in many natural waters and soils as a result of spills and careless disposal practices. Many of these compounds are chemically stable and are thus resistant to environmental degradation. In addition, large quantities of PCB contaminated oils are currently stockpiled throughout the United States.

A study by Sherman, W. V., et al., *Nature*, Vol. 232, pp. 118–119 (1971), demonstrated a chain mechanism for the decomposition of DDT involving the participation of radiolytically induced free radicals. It was shown that while DDD was a major dechlorinated decomposition product, at high dose rates, DDD yield was smaller than DDT consumption. These studies were performed in an alkaline isopropanol solution. The solutions were deaerated since oxygen is known to be a free-radical scavenger.

Two PCB congeners (a trichlorobiphenyl and tetrachlorobiphenyl) were irradiated in various solvents with accelerated electrons by Merrill, E. W., et al., *American Institute of Chemical Engineers, Symposium Series*, Vol. 74, pp. 245–250 (1978). The mechanism of PCB degradation in this study also was believed to be free radical-induced, with the irradiated solvent as a source of free radicals. Much higher dose rates were required to achieve decomposition to near completion in nonpolar solvents such as hexane, than in aqueous solution.

It was observed by Sawai, T., et. al., *Bulletin of the Chemical Society of Japan*, Vol. 47, No. 8, pp. 1889–1893 (1974) that the mixtures of various PCBs in alkaline isopropanol were irradiated with $^{60}$Co gamma-rays, the major products were biphenyl and lower chlorinated biphenyls. Chloride ions and acetone reaction products were also detected. The isopropanol was viewed as a source of OH radicals while the base (KOH) was used as a receptor for free chloride produced by dechlorination. In studies where the basic chloride receptor was not used, hydrochloric acid was produced proportionally to the radiation dose received. (Evans, R., et al., *Journal of Physical Chemistry*, Vol. 75, No. 18, pp. 2762–2764 (1971); and Sherman, supra).

A trichlorinated biphenyl was irradiated in both aqueous and alkaline isopropanol solutions using $^{60}$Co gamma-rays (Schweitzer, J. F., et al., *Journal of Radioanalytical and Nuclear Chemistry Letters*, Vol. 118, No. 5, pp.323–330 (1987)). While low doses (0.5 kGy) achieved significant decomposition in deaerated alkaline isopropanol, relatively high doses (43 kGy) were required in aerated aqueous solutions having a 50 parts per billion of trichlorinated biphenyls.

In general, it is known that gamma irradiation of chlorinated hydrocarbons in alkaline polar solvents results in the production of free radicals via chain dechlorination to the next less chlorinated species. Acetone and chloride ions are also produced. The reaction is often more efficient in the absence of free radical scavengers such as $O_2$. At high dose rates the production of the less chlorinated product is not stoichiometric. Currently a regulatory threshold of 50 parts per million of polychlorinated biphenyls has been established under the federal Toxic Substances and Control Act. Therefore, it is desirable to provide a method for the degradation of solutions contaminated with polychlorinated biphenyls, to a level below the regulatory threshold in a closed system to prevent the release of the PCBs into the environment. Additionally, it is desirable to provide a PCB destruction method that does not rely on the addition of chemicals to the PCB contaminated solution.

It is an object of this invention to provide an in-situ method for the decomposition of chlorinated hydrocarbons in transformer, hydraulic and mineral oils using gamma radiation.

It is another object of this invention to provide a method for the decomposition of halogenated hydrocarbons using spent nuclear reactor fuel as a gamma radiation source.

It is still a further object of this invention to provide a method for the decontamination of electrical equipment containing oils contaminated with polychlorinated biphenyls by irradiation with a specific dose of gamma radiation.

Additional objects, advantages and novel features of the invention will become apparent to those skilled in the art upon examination of the following and by practice of the invention.

SUMMARY OF THE INVENTION

To achieve the foregoing and other objects, a method for the in-situ destruction of PCBs in oil, such as those found in transformers and other electrical equipment, is provided. The in-situ method of the present invention is selective enough to allow recovery and reuse of the oil or equipment. A sufficiently large dose of gamma radiation is applied to the PCB contaminated object or oil to cause chemical breakdown of the PCB. The rate of decomposition of the PCBs exceeds that of the transformer oil such that the process is inherently PCB selective. The in-situ method of the present invention consists of irradiating PCB contaminated objects such as electrical transformers or transformer oil with a sufficiently penetrating energy of gamma radiation to cause PCB decomposition. The highly penetrating nature of the gamma rays makes it possible to destroy PCBs inside transformers, drums, or other forms of containers or packaging. The amount of applied dose required is dependent upon the initial PCB contamination level, the type of material containing the PCBs and the type and thickness of the container or object. Analytical sampling of the PCB contaminated material before and after gamma irradiation provide guidance concerning the required applied irradiation dose level and assures that the processed material is below the PCB contaminated level when finished.

The process of the invention is advantageous in that it does not require repackaging, addition of chemicals, or general PCB exposure of personnel to accomplish destruction of the PCB contamination. Destruction of the PCBs occurs in a closed system which is easily sampled for verification of process completion. The process requires no off-gas monitoring and releases no gaseous effluent as compared to incineration processes. Contaminated objects or oils can be re-irradiated to the extent necessary to lower the PCB content to the desired level. Therefore, irradiation times and applied dose levels can be tailored to the specific need for each level of PCB contamination and type of contaminated object or container.

The irradiation can be accomplished using isotopic gamma ray sources such as Cesium-137, Cobalt-60, or spent fuel from nuclear power reactors. In the latter case, a dry tube which extends into the spent fuel storage pool can be constructed to allow irradiation of the desired objects. Normally, the spent fuel would be arranged around the irradiation tube to optimize the dose rate applied.

BRIEF DESCRIPTION OF THE DRAWINGS

The present invention is illustrated in the accompanying drawings where.

DETAILED DESCRIPTION OF THE INVENTION

Figure 1:
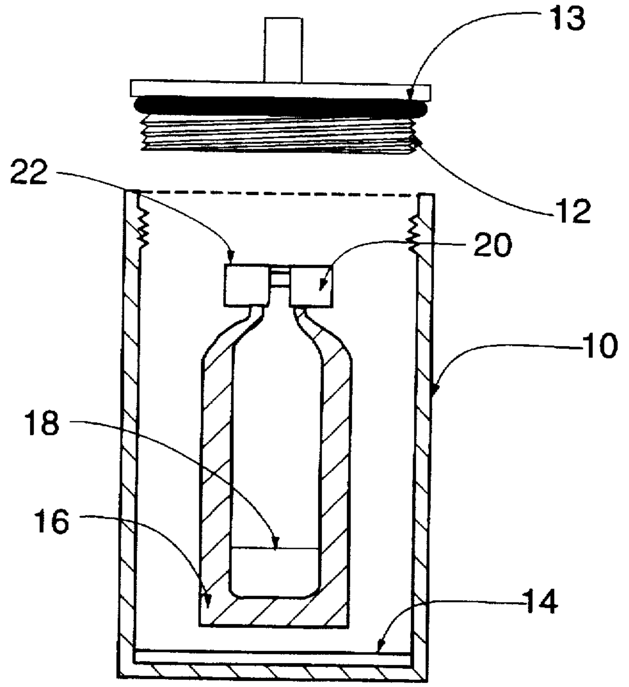
FIG. 1 is an illustration, partly in section, of sample capsules used for irradiation of chlorinated hydrocarbons.

Referring now to FIG. 1 a schematic drawing of the sample stainless steel capsule 10 used for irradiation of chlorinated hydrocarbons is shown. Capsule 10 is sealed with a threaded cap 12 and sealed with a O-ring 13. A rubber pad 14 is positioned inside the capsule to protect the glass vial 16 containing the chlorinated hydrocarbon sample 18. The glass vial 16 is sealed with a crimp-on-cap 20 attached to the septum 22 of the vial to prevent spills of the sample during the experimental studies.

The polychlorinated biphenyl samples were gamma irradiated with spent fuel at the Advanced Test Reactor (ATR) of the Idaho National Engineering Laboratory. Fuel is periodically replaced as it becomes depleted or flux changes are needed and spent fuel is stored in an adjacent canal. This fuel is considered a good source of gamma-rays with an average energy of 700 keV. Preferably, the gamma radiation source used in the present invention provides an average energy ranging from 700 to 9000 keV, as in FIG. 3. There are few neutrons, consequently no activation of the samples results. Additionally, the samples do not become radioactively contaminated since the penetrating ability of the gamma-rays allows for multiple layers of containment between the sample and radioactive spent fuel serving as the gamma-ray source. Various dose rates may be achieved by proper positioning of fuel elements around the dry tube.

Figure 2:
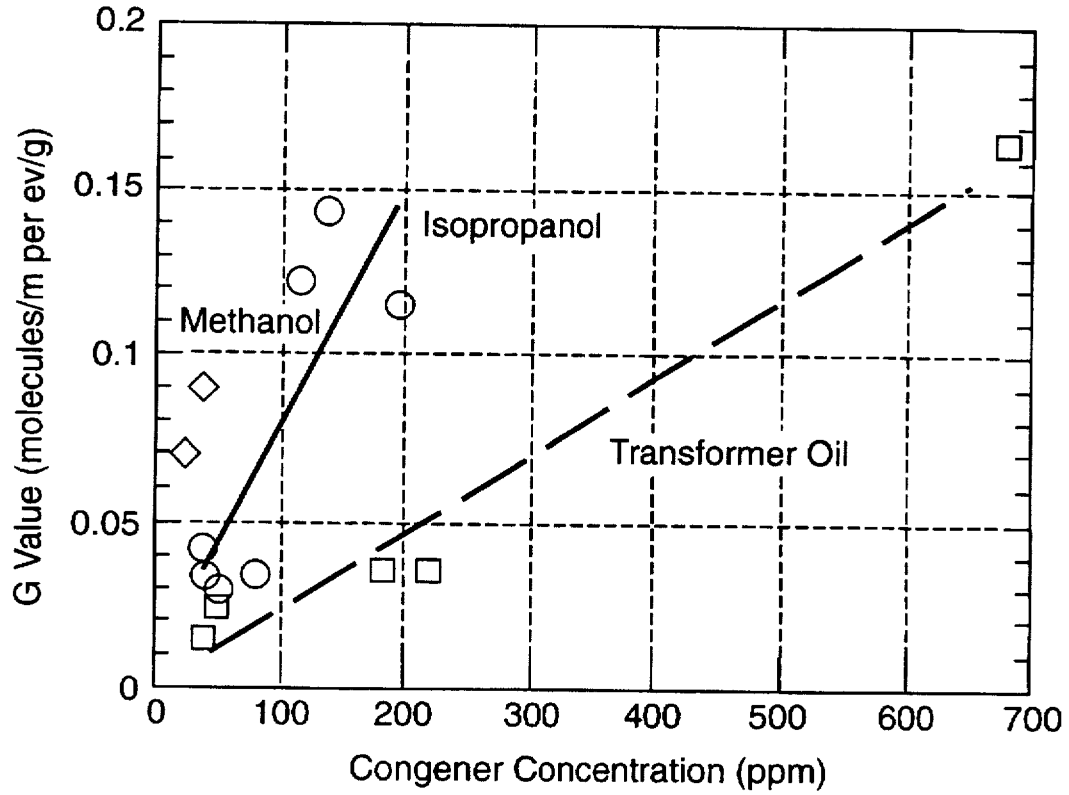
FIG. 2 is a graph showing degradation efficiency versus concentration of PCB congener in methanol, isopropanol and transformer oil.
Figure 3:
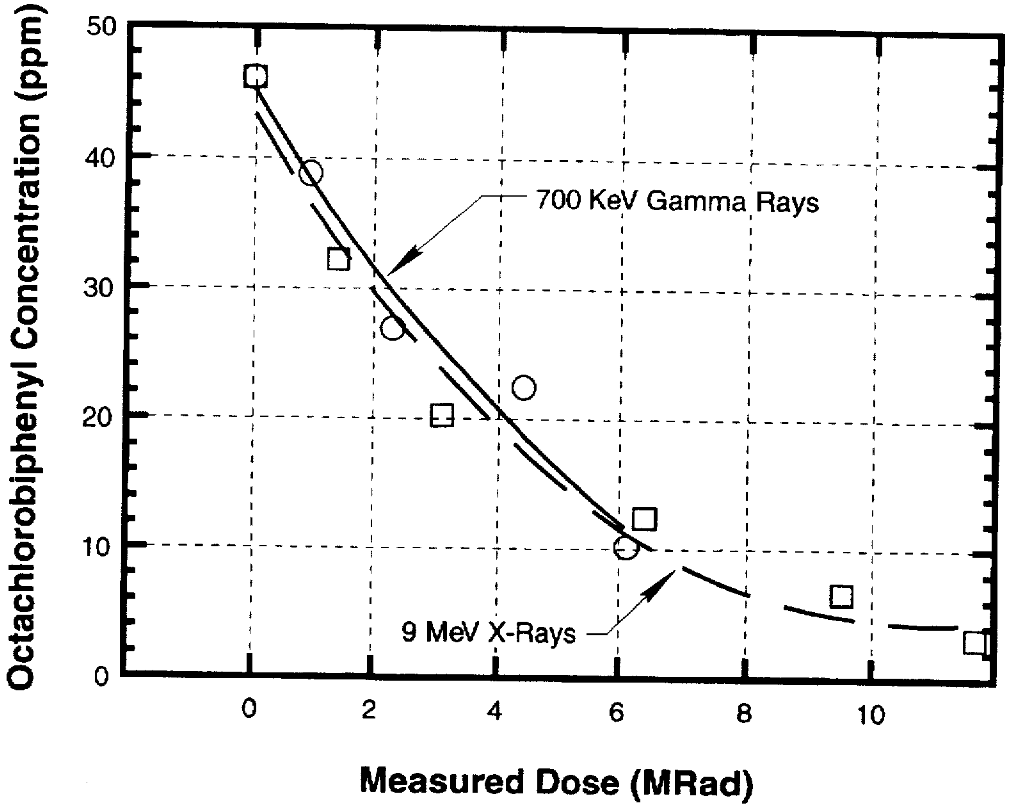
FIG. 3 is a graph showing radiolytic decomposition of the PCB octachlorobiphenyl in transformer oil versus applied gammaray dose.

The efficiency of radiolytic decomposition reactions is commonly reported in terms of G values. The G value allows for comparison of experimental results and optimization of irradiation conditions. The G values were calculated as the number of molecules/ml decomposed per 100 eV/g of energy deposited. The G values for the radiolysis of many combinations of PCBs and solvents have been measured. FIG. 2 shows a comparison of G values versus PCB concentration for methanol, isopropanol and transformer oil. It can be seen that the efficiency of decomposition is highest in high dielectric constant solvents. This observation suggests that a charged species is an important active intermediate in the radiolysis mechanism. Charged species have longer lifetimes in more polar solvents. While the decomposition of PCBs in transformer oil is less efficient than in alcohols, it can be seen in FIG. 3 that is still feasible at easily achievable doses. FIG. 3 also compares the irradiation of PCBs in oil using the ATR spent fuel source and an irradiation using a linear accelerator. It can be seen that the decomposition curves for the two sources are statistically identical. Thus the photon energy and dose rate are not important to the radiolysis reaction, rather only the total absorbed dose. This suggests that the reactive intermediate is produced at steady state concentrations. Preferably the absorbed dose in the present invention is less than 100 millirads.

One possible reactive intermediate, which is a charged species likely to be produced in excess during gamma irradiations, is the free, thermalized electron. The source of these thermal electrons would be the photoelectric and Compton effects which result from gamma ray interactions with matter, in this case the solvent. These high energy free electrons are expected to thermalize in about $10_{-7}$ seconds. The lifetimes of the free, thermalized electrons are dependent on the ability of the medium to solvate them, which is in turn dependent upon the solvent's dielectric constant.

Figure 4:
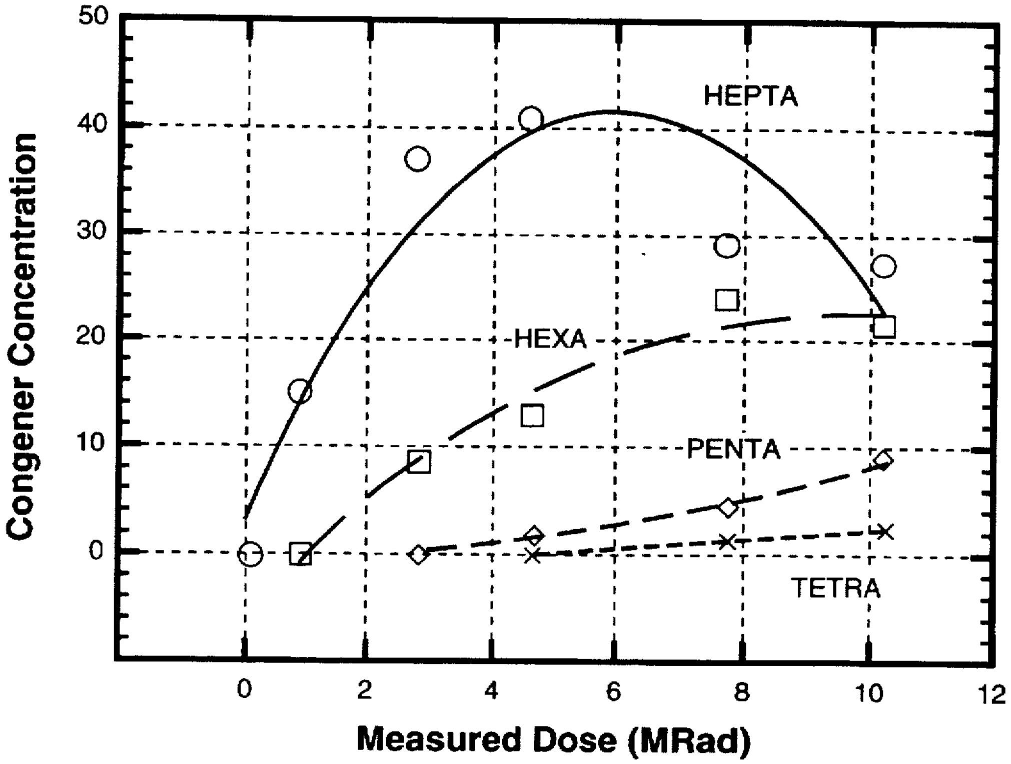
FIG. 4 is a graph showing the ingrowth of dechlorination products as lower chlorinated biphenyls.

An understanding of the mechanism of PCB radiolysis is important to the design of an efficient PCB treatment process. To determine the nature of the reactive intermediate of the PCB radiolysis reaction, a number of thermal electron scavenger experiments were conducted. In one experiment, 1.6M carbon tetrachloride was added to the solutions of octachlorobiphenyl in methanol, isopropanol and transformer oil. The presence of carbon tetrachloride, a known electron scavenger, suppressed the decomposition of the PCB in all solvents. It is observed that thermal electrons are an important active intermediate, consistent with what is observed when solvent dielectric strength is varied. The thermal electrons generated during radiolysis cause dechlorination of the PCB molecule. FIG. 4 is a graph illustrating the ingrowth of lower chlorinated PCB during irradiation.

Figure 5:
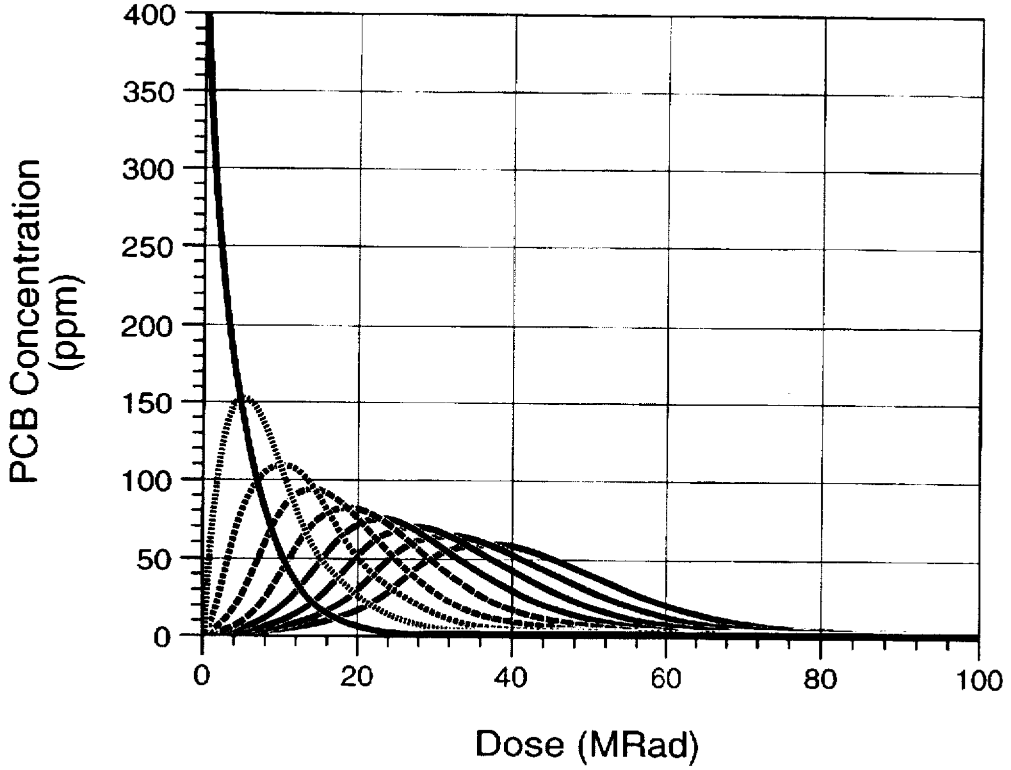
FIG. 5 is a graph illustrating the relationship between PCB concentrations and daughter ingrowth versus the applied gamma ray dose.

Referring now to FIG. 5, a computer generated graph illustrating octachlorobiphenyl decomposition in transformer oil and daughter ingrowth versus applied dose is shown. The total PCB concentration at any dose is the sum of all displayed isomer concentrations. As can be seen in FIG. 5, an approximate 51 Mrad (510 kGy) dose is required to reduce the 400 ppm octachlorobiphenyl in transformer oil and its dechlorination daughter products to less than the current regulatory threshold limit of 50 ppm.

As a result of these studies, it is possible to provide a process for the decomposition of chlorinated hydrocarbons wherein the treatment of oils, such as deaeration or addition of chloride receptors is not necessary to achieve significant decomposition. Since treatment of oils is not necessary, it is now possible to provide for the degradation of polychlorinated biphenyls in transformer oil without opening the transformer or container.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A process for the high energy selective decomposition of chlorinated hydrocarbons in oil without generating off-gas byproducts, comprising, subjecting the oil containing chlorinated hydrocarbons to a gamma radiation energy having an average energy in the range of between 700 to 9000 keV for a sufficient time and applied dose rate to decompose the chlorinated hydrocarbons at a decomposition rate that exceeds a decomposition rate of the oil to provide desired concentration levels of chlorinated hydrocarbons in the chlorinated hydrocarbons and oil mixture.

2. The process of claim 1 wherein the chlorinated hydrocarbons are polychlorinated biphenyls.

3. The process of claim 1 wherein the gamma radiation source is spent nuclear reactor fuel.

4. The process of claim 1 wherein the gamma radiation source is an isotopic gamma ray source.

5. The process of claim 1 wherein the gamma radiation source is a linear accelerator.

6. The process of claim 1 wherein the oil is selected from the group consisting of hydraulic, mineral, or transformer oil.

7. A process for the high energy selective decomposition of chlorinated hydrocarbons in a mixture of chlorinated hydrocarbons and oil, the steps comprising: providing a chlorinated hydrocarbons and oil mixture; providing a gamma radiation source having an average energy in the range of between 700 to 9000 keV; exposing the chlorinated hydrocarbons and oil mixture to the gamma radiation source for a sufficient time to provide an absorbed dose to the chlorinated hydrocarbons and oil mixture of less that 100 millirads, said absorbed dose being sufficient to decompose the chlorinated hydrocarbons at a rate that exceeds a decomposition rate of the oil to provide desired concentration levels of chlorinated hydrocarbons in the chlorinated hydrocarbon and oil mixture.

8. The process of claim 7 wherein the chlorinated hydrocarbons are polychlorinated biphenyls.

9. The process of claim 7 wherein the gamma radiation source is spent nuclear reactor fuel.

10. The process of claim 7 wherein the gamma radiation source is an isotopic gamma ray source.

11. The process of claim 7 wherein the gamma radiation source is a linear accelerator.

12. The process of claim 7 wherein the oil is selected from the group consisting of hydraulic, mineral, or transformer oil.

* * * * *